Patented July 20, 1943

2,324,843

UNITED STATES PATENT OFFICE 2,324,843

LUMINESCENT MATERIAL AND METHOD OF PRODUCING SAME

Rudolph C. Hultgren and Sampson Isenberg, Chicago, Ill., assignors to General Luminescent Corporation, Chicago, Ill., a corporation of Illinois No Drawing. Application November 30, 1939, Serial No. 306,850

5 Claims. (Cl. 250—81)

Our invention relates to an improved method of producing luminous magnesium tungstate and to an improved product resulting from the practice of the method.

Magnesium tungstate has been suggested for the production of various types of luminescent products. This material, when excited, has a whitish to bluish green color and may, of course, be used alone if this particular color is desired, or it may be used in connection with other luminescent materials, for example, in combination with zinc beryllium orthosilicate types of materials, which produce a whitish to pinkish color when excited, the two luminescent materials in theory being complementary so as to produce substantially a white light.

Magnesium tungstate has been used without a separate activator and also has been produced with various activators, such, for example, as approximately 1% of lead. I have found that magnesium tungstate produced heretofore by processes known in the art has a maximum luminosity of about thirty to thirty-two foot candles. Lead is sometimes used as an activating substance, although magnesium tungstate alone is luminescent. The lead activated magnesium is objectionable because it has a tendency to darken in the tube. When magnesium tungstate is used alone, it is, as a rule, not sufficiently luminous to produce a striking effect on the eye, such as is obtained with green willemite for example, and, if it is used admixed with other luminescent materials for the purpose of imparting its particular radiation to the total effect, a sufficiently large amount of the magnesium tungstate must be used so as to decrease, to some extent, the light output of the tube as a whole. Factors well known in the art will illustrate why this is true. It is known that a relatively thin even coating of luminescent material is necessary to obtain the maximum light output. To produce a thicker coating decreases the light output rather than increases it. As a result, there is a limit to the amount of luminescent material which can be used to cover a definite area. If, therefore, a relatively large amount of a material must be employed which in itself has low luminosity, it is bound to affect the luminosity of the tube as a whole.

The principal object of our invention is the provision of improved luminescent magnesium tungstate.

A further object is the provision of improved methods for producing luminescent magnesium tungstate.

Other specific objects, features and advantages of the invention will be brought out in the following detailed description.

In carrying out our invention, we first mix together stoichiometric proportions of reacting or starting materials which, on being fired or heated to a relatively high temperature for a sufficient length of time, will produce magnesium tungstate. These materials are mixed together thoroughly and are then fired at a suitable temperature for a sufficient time to produce magnesium tungstate. The temperatures and the time of heating may vary. Decreasing the temperature markedly is not advisable because of extremely slow rate of reaction, and running the temperature up appreciably above 1150 or 1200 degrees C. will have a tendency to volatilize some of the constituents, particularly the magnesium, and also cause some decomposition of the product. The purpose of the first firing step is to produce a crystalline magnesium tungstate. This material as produced is luminous, but the luminosity is relatively low, being of the order of that found in the prior art products.

The resulting fired product is then ground intimately for a relatively long period of time with a material of the class consisting of magnesium oxide or a substance which, on firing, will produce magnesium oxide. 5% to 10% of magnesium oxide, based upon the MgO content of the compound, in general is suitable. For convenience, one may take approximately 1% of magnesium oxide, based upon the compound as a whole, and suitable results will be secured.

In the grinding operation referred to immediately above, it is preferable to grind wet, and, for this purpose, we prefer to use a volatile liquid such as methanol. Grinding is continued preferably for a sufficient length of time to obtain the maximum state of subdivision possible. Twenty-four to forty-eight hours are representative, although the products may be ground for as much as sixty hours. We do not mean to say that we obtain the absolute maximum state of subdivision in the grinding operation, but rather the maximum practical state of subdivision obtainable in commercial manufacture. If a material be ground for forty-eight hours, for example, and a test sample taken every hour or two during this period, it will be found that each test sample is somewhat finer than the preceding test sample. After approximately forty-eight hours, however, the exact time depending upon conditions, grinding may be continued for another twenty-four hours, with only very slight decrease in particle size. When a state is reached wherein additional prolonged grinding has only a very slight effect upon particle size, then we have reached the stage which we define as that wherein the greatest practical commercial state of subdivision has been obtained by ordinary grinding such as in a ball mill.

When the material has been thoroughly ground in the manner described, it is dried, powdered and sifted, and subsequently refired. In general, the temperature in the second firing step may be somewhat lower than the temperature in the first firing step. After firing the second time, the material may be broken up and sifted and used directly for suspension in a volatile liquid for the production of a coating vehicle for luminescent tubes and the like. For the purpose of getting a thorough intermixing of the particles with the volatile liquid employed in coating, we may ball mill after the second firing for a short period, for example, one hour. Usually somewhat better results are obtained when this step is employed. It is our conception that some of the fine particles adhere to each other because of the second firing step, and a short period of ball milling will serve to break up the resulting small masses of mutually adhering particles. It may be, however, that the ball milling of the final product merely has the effect of more intimately wetting the particles with the volatile liquid.

In accordance with one manner of carrying out our invention, we take approximately 40 parts of magnesium oxide (MgO) and approximately 232 parts of tungstic oxide ($WO_3$). These materials are introduced into a ball mill dry, and the ball mill operated for a sufficient length of time to produce an intimate mixture of the two materials. From four to eight hours ball milling is suitable. The material removed from the ball mill is heated to a temperature between 1100 and 1150 degrees C. for one hour. To one hundred parts by weight of this material, we add one part of magnesium oxide and 30 to 35 parts by weight of methanol. This mixture is introduced into a ball mill provided with silica balls of about ½" to ¾" diameter, and the ball mill operated for a period of about forty-eight hours. The material is then removed from the ball mill, dried, powdered, and sifted, and again fired for a period of about one hour at 1000 degrees C.

The material so produced may be introduced into a volatile liquid, such as methyl alcohol (e. g. commercial methanol), containing a relatively small proportion, for example 2% to 5%, of a cellulosic material which will function to maintain a suspension of the luminescent material in the alcohol and also serve as a temporary binder. When used in this manner, the tubes are flushed with the coating vehicle, the alcohol is evaporated, and the tubes are heated to a relatively high temperature, for example, about 400 degrees C., at which temperature the cellulosic material is burned out, leaving a coating of the magnesium tungstate in the tube.

In accordance with another method of treatment, the luminescent material produced in accordance with the example may be ball milled for approximately one hour with approximately one-half its own weight of methanol, the thin paste so produced being then mixed with an added proportion of methanol to produce a freely flowing suspension which may be coated on the inside of a tube by a flushing operation. In accordance with this method, without the use of a temporary binder, the tube is completed, so far as the application of the luminescent material is concerned, by evaporation of the methanol.

In accordance with another manner of use (and this represents the commonest use of magnesium tungstate, in accordance with the present condition of the art), a proportion of magnesium tungstate is mixed with a luminescent material producing a white to pinkish color, such as zinc beryllium orthosilicate activated with manganese. A very desirable white light is produced by employing approximately thirty parts of the magnesium tungstate produced in accordance with the example given, with approximately 70 parts of the luminescent material disclosed in Examples 1 to 4, inclusive, of the copending application of Sampson Isenberg, Serial No. 279,119, filed June 14, 1939.

Instead of employing the oxides as the starting materials, the chlorides, sulphates, nitrates, or the like, of magnesium or tungsten may be employed which, on firing, will produce magnesium tungstate ($MgWO_4$). Those skilled in the art are sufficiently acquainted with the chemistry involved in the production of magnesium tungstate so that we deem it unnecessary to give specific examples showing the use of starting materials other than the oxides.

By following the teachings of our invention, we find that a luminous magnesium tungstate is produced at all times having a luminosity greater than thirty-five foot candles. When this material is coated on the inside of a tube filled with a mercury argon mixture, and a current is passed across electrodes contained in the tube, in accordance with the usual practice, the luminosity is of the order of forty-two foot candles or better. This result may be compared with thirty to thirty-two foot candles, the maximum brilliancy obtainable with prior art magnesium tungstate when excited under the same conditions.

The material of our invention does not employ an activator, as this term is normally used. It may be that the MgO introduced in the ball milling operation which follows the preliminary production of the compound $MgWO_4$ in itself has some activating action. We find that the results described are not obtained to the same extent unless the compound MgO, or other compound which on firing will produce MgO, is thoroughly intermixed with and ground into the previously produced magnesium tungstate.

In addition to the advantages obtained, such as increased brilliancy, which have already been described, the process of our invention serves to produce a complete luminescent material of very small particle size. This is of considerable advantage where coating operations are carried out in accordance with the intended manner of use of the product. We find also that the drop or loss in luminosity with age is decreased when the material is produced in accordance with our process. Another advantage is that the process is more readily controlled in the ordinary manufacturing establishment than processes heretofore employed for producing magnesium tungstate, particularly those processes which employ a separate activator such as lead or tin.

The significant steps of our process do not relate particularly to the starting materials but rather to the initial production of magnesium tungstate, the subsequent prolonged milling of the magnesium tungstate so produced with an additional quantity of magnesium oxide, and the final firing of this thoroughly milled product at a temperature usually somewhat less than the initial temperature at which the original magnesium tungstate was produced. The temperatures and time of treating are not critical, although the best results are obtained when the first heating is carried out at approximately 1100 degrees C. to 1150 degrees C. for approximately one hour, and the second heating step at about 1000 degrees C. also for one hour.

The initial dry ball milling operation is not of significance except so far as it is necessary or desirable to facilitate forming an intimate mixture of the reacting materials for the purpose of producing the original magnesium tungstate compound. The initial mixing operation conveniently may be carried out in a ball mill, as already pointed out, by a simple dry milling process. About four to eight hours of milling gives the best results, whatever the starting materials may be, it being better to increase the time rather than decrease it so as to be assured of a thorough mixing of the product.

We referred above to the increased brilliancy of the magnesium tungstate made in accordance with our invention. When our material is coated on the inside of a 12 millimeter diameter tube, the tube evacuated in the ordinary way, neon, argon and mercury introduced in the usual manner, and a current of 30 milliamperes passed through the tube, a light meter held near the tube will show a brilliance as great as 42 foot candles or better, or at all times a brilliance of at least 35 foot candles. The type of tube identified is more or less standard in the industry. When we refer either in the specification or claims to the brilliance of our materials in terms of foot candles, it is to be understood that the measurements are made in general in accordance with the routine described.

What we claim as new and desire to protect by Letters Patent of the United States is:

1. The method of producing luminous magnesium tungstate, which comprises mixing together stoichiometric proportions of materials which on heating will produce magnesium tungstate, heating such materials at a sufficiently high temperature to cause reaction, mixing the compound with a small proportion of magnesium oxide and a sufficient proportion of an innocuous volatile liquid to form a relatively thin paste, ball milling such mixture until substantially the minimum particle size obtainable by progressive grinding in a ball mill is reached, drying the ground product and then refiring it.

2. The method of producing a highly luminous magnesium tungstate, which comprises mixing together stoichiometric proportions of magnesium oxide and tungstic oxide, heating the mixture to form magnesium tungstate, subjecting the resulting magnesium tungstate to prolonged grinding in a ball mill with a relatively small proportion of magnesium oxide and a sufficient proportion of an innocuous volatile liquid to form a thin paste, drying the ground product, and then refiring it.

3. The method of producing a highly luminous magnesium tungstate, which comprises grinding together in dry form stoichiometric proportions of materials reacting on heating to form magnesium tungstate, heating the material to relatively high temperature until reaction is substantially complete, grinding the resulting material in a relatively low molecular weight alcohol sufficient to form a paste, a relatively small proportion of magnesium oxide being introduced during grinding, drying the resulting material, and again firing it.

4. The method of producing a highly luminous magnesium tungstate which comprises ball milling stoichiometric proportions of MgO and $WO_3$ for four to eight hours, heating the resulting mixture for about one hour at between 1100 degrees C. and 1150 degrees C., ball milling the magnesium tungstate so produced for twenty-four to forty-eight hours with enough relatively low molecular weight alcohol to form a relatively thin paste, and about 5% to 10% of MgO based upon the proportion of MgO employed in the formation of the magnesium tungstate, drying and powdering the resulting product, and heating it for about one hour at about 1000 degrees C.

5. The method of producing a highly luminous magnesium tungstate, which comprises ball milling together magnesium oxide (MgO) and tungstic oxide ($WO_3$) in proportions of 40 parts by weight of the former and approximately 232 parts by weight of the latter to produce a substantially homogeneous mixture, firing the mixture to produce a product consisting substantially of magnesium tungstate, ball milling the resulting magnesium tungstate so produced for 24 to 48 hours with enough relatively low molecular weight alcohol to form a relatively thin paste, incorporating with the said magnesium tungstate and alcohol during the ball milling a relatively small proportion of magnesium oxide, the ball milling being continued for at least 24 hours to produce a relatively very finely divided product, and intimately mixing the magnesium oxide and magnesium tungstate, drying the resulting product to produce a relatively fine dry powder, and firing the said powdered product to produce a highly luminous magnesium tungstate in a relatively fine state of sub-division.

RUDOLPH C. HULTGREN.
SAMPSON ISENBERG.